Figure 1:
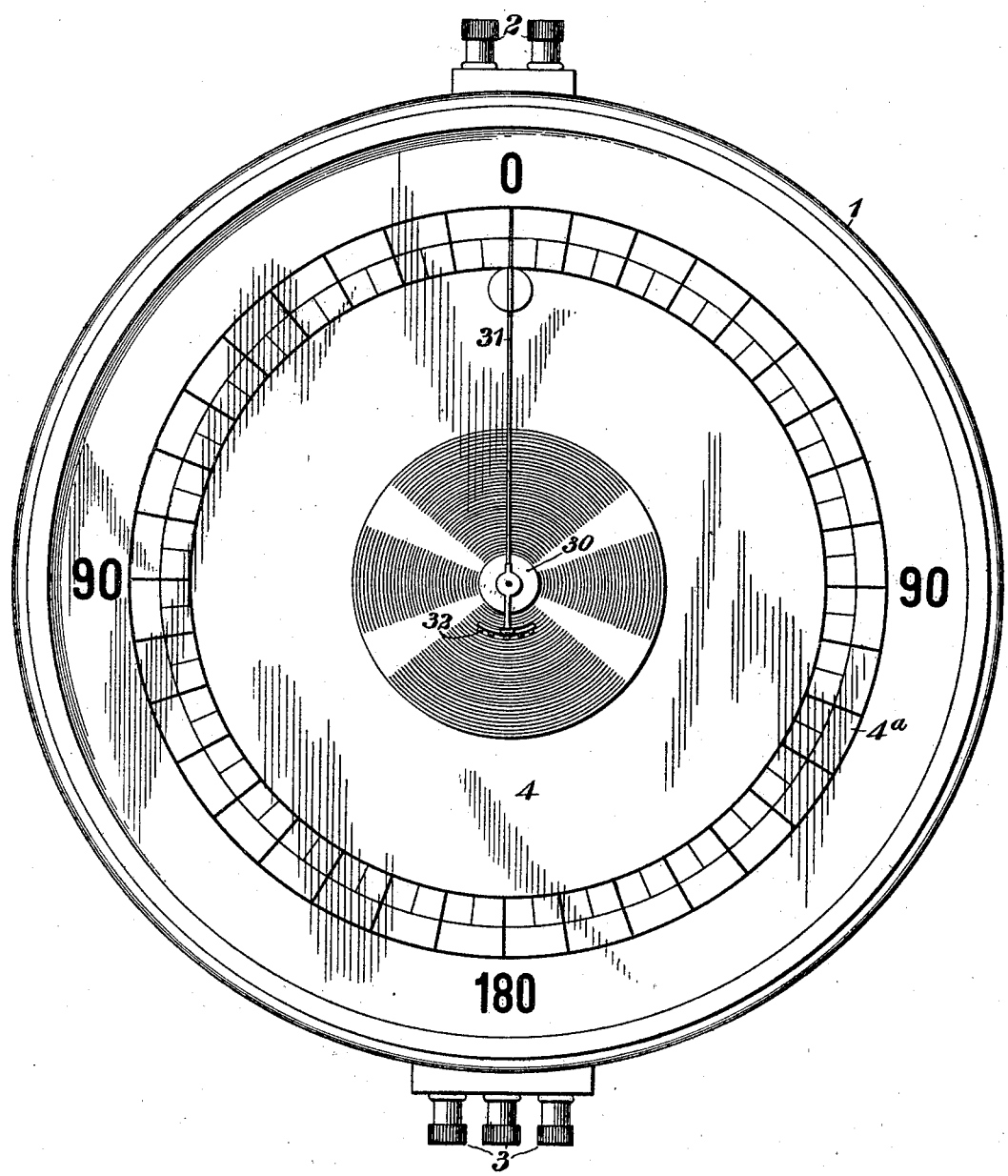

No. 695,913. Patented Mar. 25, 1902.
F. CONRAD.
INSTRUMENT FOR INDICATING THE PHASE AND FREQUENCY RELATIONS OF ALTERNATING CURRENTS.
(Application filed July 12, 1901.)
(No Model.) 3 Sheets—Sheet 1.

WITNESSES:
C. L. Belcher
Birney Hines

INVENTOR
Frank Conrad
BY
Wesley G. Carr
ATTORNEY.

No. 695,913. Patented Mar. 25, 1902.
F. CONRAD.
INSTRUMENT FOR INDICATING THE PHASE AND FREQUENCY RELATIONS OF ALTERNATING CURRENTS.
(Application filed July 12, 1901.)
(No Model.) 3 Sheets—Sheet 2.
Fig. 2.
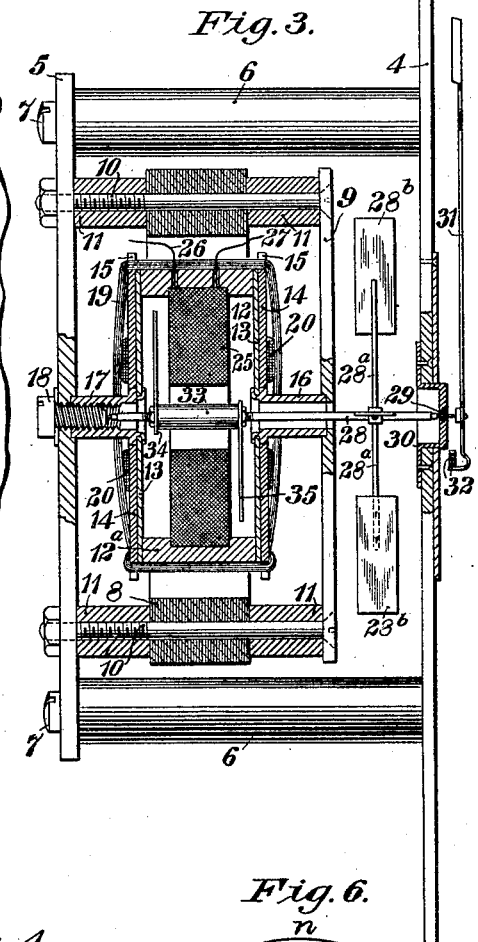
Fig. 3.
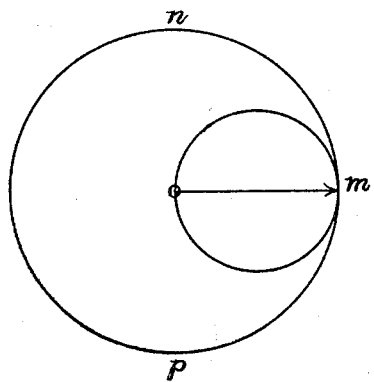
Fig. 5.
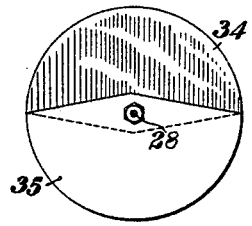
Fig. 4.
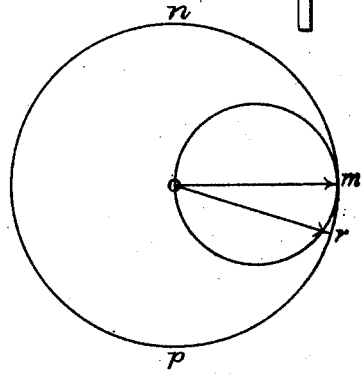
Fig. 6.
WITNESSES:
C. L. Belcher
Birney Hines
INVENTOR
Frank Conrad
BY Hesley G. Carr
ATTORNEY.

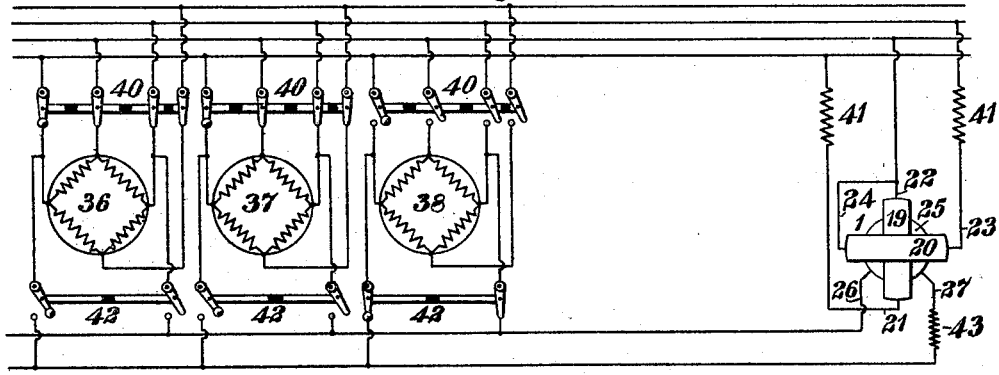
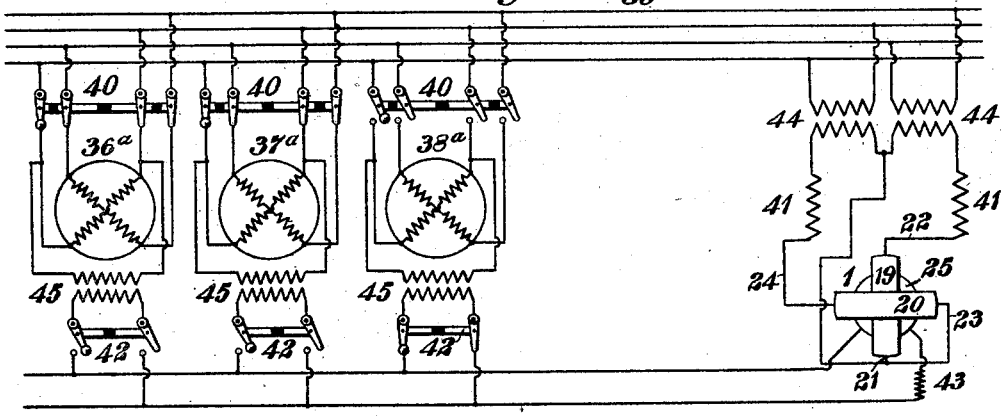
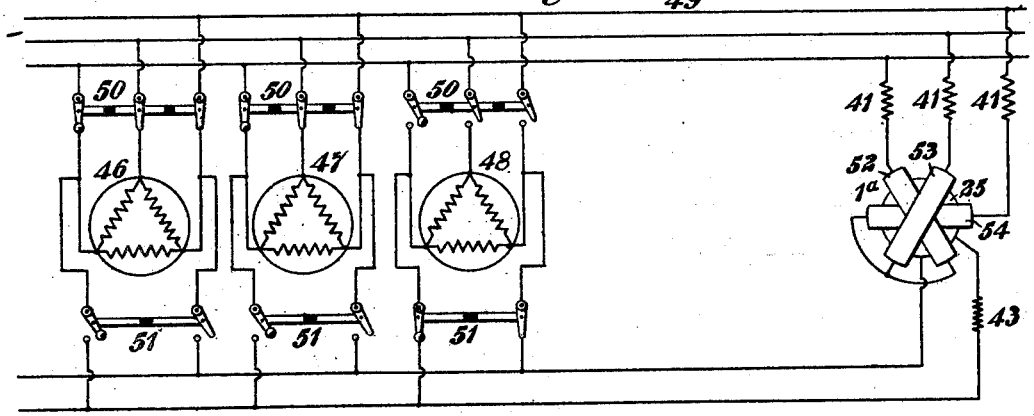

UNITED STATES PATENT OFFICE.

FRANK CONRAD, OF WILKINSBURG, PENNSYLVANIA, ASSIGNOR TO WESTINGHOUSE ELECTRIC & MANUFACTURING COMPANY, A CORPORATION OF PENNSYLVANIA.

INSTRUMENT FOR INDICATING THE PHASE AND FREQUENCY RELATIONS OF ALTERNATING CURRENTS.

SPECIFICATION forming part of Letters Patent No. 695,913, dated March 25, 1902.

Application filed July 12, 1901. Serial No. 68,046. (No model.)

*To all whom it may concern:*

Be it known that I, FRANK CONRAD, a citizen of the United States, residing at Wilkinsburg, in the county of Allegheny and State of Pennsylvania, have invented a new and useful Improvement in Instruments for Indicating the Phase and Frequency Relations of Alternating-Current Circuits, of which the following is a specification.

My invention relates to electrical indicating instruments, and particularly to such instruments as are employed for the purpose of indicating the phase and frequency relations of two alternating-current circuits; and it has for its object to provide an instrument of this character which shall be simple and compact in construction, reliable in operation, and which has no moving coils and is therefore substantially free from liability to disarrangement of parts, and also obviates the necessity of employing relatively moving contact devices.

My invention is illustrated in the accompanying drawings, in which—

Figure 1 is a face or front elevation of an instrument embodying my invention. Fig. 2 is a rear view of the operating parts of the instrument, portions of the front frame-plate being broken away. Fig. 3 is a view, partially in side elevation and partially in vertical section, of the operating parts. Fig. 4 is a detail front elevation of the armature of the instrument. Figs. 5 and 6 are diagrams illustrating the forces acting upon the parts of the instrument. Fig. 7 is a diagram of the circuits and connections for an instrument employed in connection with quarter-phase generators. Fig. 8 is a view similar to Fig. 7, but showing the use of transformers between the instrument and the circuits in connection with which it is used. Fig. 9 is a view corresponding to Fig. 7, but showing three-phase generators and circuits and the coils of an instrument adapted for use in connection therewith.

In the operation of a plurality of alternating-current generators to supply energy to the same circuit, whether single phase or polyphase, it is essential to satisfactory operation that the machines shall operate in synchronism—that is, that they shall not only so operate as to provide the same frequency of alternations, but that the maxima and minima of the current and electromotive-force waves shall coincide in time—and it is desirable that synchronous operation be attained before the machines are connected in parallel.

Instruments have heretofore been devised for indicating the phase relation of alternating-current machines in order that the proper conditions for connection in parallel might be indicated to the attendant; but all such instruments with which I am familiar have embodied one or more moving coils and have thus necessitated the use of relatively moving current-collecting devices. By my present invention I propose, as has already been indicated, to avoid the use of moving coils and to generally simplify and improve the structure of the instrument beyond what has heretofore been attained.

Referring now particularly to Figs. 1 to 4, inclusive, of the drawings, the casing of the instrument 1 (indicated in Fig. 1) is provided with two binding-posts 2 at one side for connection with one of the circuits or with one phase of one of the circuits in connection with which the instrument is to be used and at the other side is provided with three binding-posts 3 for connection with the other circuit, the phase relation between which and that to which the binding-posts 2 are connected is to be determined. The casing may be of usual construction, having metal sides and back and a glass front, and inclosed within it is a framework comprising a dial-plate 4, on which the indicating-scale 4$^a$ is marked, a bar 5 at the back, and distance or spacing posts 6, through which project the bolts 7 for fastening the plate 4 and the bar 5 together. Between the plate 4 and the bar 5 is supported a laminated iron ring 8, the direct supporting means being a bar 9, bolts 10, and spacing-blocks 11. Concentrically arranged within the ring 8 and out of contact therewith is a shell or framework 12, comprising a cylinder 12$^a$ of insulating material, end plates 13, which may be of non-magnetic metal or insulating material, as desired, insulating-plates 14, having peripherical radial projections 15, and centrally-located tubes 16 and 17, the inner ends of which are fitted into openings in the plates 13 and the outer ends of which are respectively fitted into seats in the bars 9 and 5. The tube 17 is shown as internally screw-threaded and as clamped into position by means of a screw 18, that engages with the internal screw-thread. Wound around the shell 12 and between the projections 15 are two windings 19 and 20, which are respectively provided with leads 21 22 and 23 24. The windings are arranged in sections, which are separated by the projections 15 in order that they may be distributed substantially over the entire surface of the supporting-shell to produce a substantially uniform field and at the same time avoid disarrangement of the windings. A stationary coil 25 is mounted in and supported by the insulating-cylinder $12^a$, so that its axis is coincident with that of the cylinder. Leads 26 and 27 from the coil 25 are connected to the binding-posts 2. (Shown in Fig. 1.) The leads 21, 22, 23, and 24 may be combined to form a three-wire connection in a well-known manner and be connected to the three binding-posts 3. (Shown in Fig. 1.) A shaft 28 projects through the tube 16, the shell 12, and the coil 25 and has a suitable jewel-bearing for its inner end in the end of the screw 18. The other end of the shaft 28 rests in a suitable jewel-bearing 29 in a plate 30, which is fastened to and forms a part of the dial-plate 4. The end of the shaft that projects beyond the plate 30 is provided with a pointer or needle 31, the free end of which moves over the scale on the face-plate of the instrument to give the desired indications. The other end of the pointer or needle is provided with suitable weights 32 for the purpose of balancing the indicator end. That portion of the shaft 28 which is within the shell 12 is provided with a tube or sleeve 33 of magnetic material, against the respective ends of which are clamped approximately semicircular plates 34 and 35, also of magnetic material, these plates being arranged to project diametrically in opposite directions from the shaft. The shaft 28 is provided with a plurality of arms $28^a$, on the ends of which are mounted vanes $28^b$ of suitable material, such as mica, these being employed for the purpose of making the instrument as nearly as possible dead-beat in its operation.

Referring now more particularly to Fig. 7, 36, 37, and 38 are two-phase generators for supplying energy to bus-bars 39 when connected thereto by means of suitable switches 40. If the coils 19 and 20 of the instrument 1 are to be connected directly to the bus-bars, they may be connected, as indicated in Fig. 7, so as to secure the desired quarter-phase relation of electromotive forces without impressing the full voltage of the generator or generators upon the instrument-coils. Resistances 41 may also be employed in order to further reduce the voltage upon the instrument-coils. The leads 26 and 27 from the coil 25 are arranged for connection to one phase of any one of the generators 36, 37, and 38 by means of switches 42, a suitable resistance 43 being included in the circuit in order to reduce to the desired degree the electromotive force that is impressed upon the coil 25. As shown in the drawings, the switches 40, between generators 36 and 37 and the bus-bars, are closed and the corresponding switches 42 are open, while the switch 40 for the generator 38 is open and the corresponding switch 42 is closed. These conditions obviously indicate that generators 36 and 37 are supplying energy to the bus-bars in parallel and that the instrument 1 is so connected in circuit as to indicate the phase relation between the generators 36 and 37 on the one hand and the generator 38 on the other.

In Fig. 8 generators $36^a$, $37^a$, and $38^a$, having star-connected windings, are shown, and transformers 44 are interposed between the bus-bars and the coils 19 and 20 of the instrument. Transformers 45 are also interposed between the generators and the coil 25 in order to reduce the voltage. In all other respects the apparatus and circuits are the same as those shown in Fig. 7.

In Fig. 9 three-phase generators 46, 47, and 48 are arranged for connection to bus-bars 49 by means of switches 50, and switches 51 are provided for connecting the coil 25 of the instrument $1^a$ to one phase of the several generators. The instrument $1^a$, which is employed in this case for indicating the phase relation of the two three-phase circuits, differs from the instrument already described only in employing three coils 52, 53, and 54 instead of the two coils 19 and 20 and in disposing them symmetrically, so as to provide an angular relation that corresponds to the phase relation of the circuits to which they are connected.

It will be understood that either the coil 25 or the coils 52, 53, and 54, or all of them, may be supplied with energy from the secondaries of transformers instead of directly from the generator-circuits, if desired.

Whatever may be the number of generators to be operated in parallel, it will be understood that each after the first will be synchronized with such as may be connected to the bus-bars before it is switched into the circuit. By employing apparatus and circuit connections like those shown in Figs. 7, 8, and 9 the phase relation between the operating machine or machines and any machine that is to be connected in parallel therewith may be determined, so that the latter may be switched in whenever it reaches synchronous operation. The desired indication is effected in the following manner, consideration being first given to the two-phase instrument: As the current in the coil 19 will have its maximum value when that in the coil 20 is zero, and vice versa, the magnetic field produced by these two coils will rotate with a speed which depends upon the frequency of the circuit to which they are connected. The coil 25 also produces a magnetic flux, the major portion of which is deflected by the armature 33 34 35, so that the relation between it and the rotating field produced by the coils 19 and 20 enables the instrument to give the proper indications. This operation may be illustrated by means of the diagrammatic Figs. 5 and 6, in which the large circle $m\ n\ p$ represents the plane of rotation of the magnetic field produced by coils 19 and 20. In the direction $o\ m$ the field is zero when the voltage on the coil 19 is zero and that on the coil 20 is at its maximum, and in the direction $o\ n$ the field will be zero when the voltage on coil 19 is at its maximum and that on the coil 20 is zero. Since the armature 33 34 35 is within the rotating magnetic field produced by the coils 19 and 20, it would rotate with that field, provided it were subjected to that influence only. It is, however, magnetized by the current in the coil 25, and consequently if the latter current is in phase either with the current in the coil 19 or with that in the coil 20 it will take up a position in which its phase will correspond to that of the rotating field. Thus if the current in coil 25 is in phase with that in coil 19 the armature will take up a position with the two semicircular plates 34 and 35 facing in the direction $o\ m$. Similarly if the current in coil 25 is in phase with that in coil 20 the armature will take up a position in the line $n\ p$. If, however, the current in coil 25 is displaced in phase from the currents in both of the coils 19 and 20, the armature will take a position corresponding to that in which the zero field of the coil 25 occurs simultaneously with that of the rotating field. While the field is rotating from the position $o\ n$ to the position $o\ m$ there will be a pull exerted upon the armature which tends to rotate it from the position $o\ m$ to position $o\ n$, and while the field is rotating from position $o\ m$ to $o\ p$ a pull will be exerted in the opposite direction from $o\ p$ to $o\ m$. These forces will be respectively proportional to the product of the strength of the rotating field in the directions $o\ n$ and $o\ p$ and that of the field due to the coil 25 in the direction $o\ m$. The total pull between the times represented by the points $n$ and $p$ may be represented by the area of the small circle having the line $o\ m$ for its diameter, in which the pull in the direction $m\ n$ is equal to the area of that portion of the circle that is above the line $o\ m$ and the pull in the opposite direction is equal to the area below the line $o\ m$. The condition represented in Fig. 5 is that in which the current in coil 25 is in phase with that in coil 20. Since the zero fields coincide in the direction $o\ m$ in this relation, the areas above and below the line are equal and the resultant pull upon the armature will be zero. As indicated in Fig. 6, the current in coil 25 is shifted in phase an amount represented by the angle $m\ o\ r$, so that its zero field coincides in time with that of the rotating field in the direction $o\ r$. Since the area above the line $o\ r$ is greater than that below it, the resultant pull upon the armature will move it through the angular distance $m\ o\ r$. The conditions above stated obtain only when the circuits to which the coils 19, 20, and 25 are connected have the same periodicity. If the circuit to which the coil 25 is connected differs in its frequency of alternations from that to which the coils 19 and 20 are connected, the armature will rotate at a speed corresponding to the difference in frequency and will come to rest only when the circuits attain the same rate of alternations. It follows, therefore, that the instrument may serve to indicate the frequency relation as well as the phase relation of any two circuits to which it is properly connected.

The operation of the three-phase instrument is substantially the same as that of the two-phase instrument, and it is therefore unnecessary to repeat the description already given.

It will be understood that the instrument may be employed to indicate the frequency and phase relations of two single-phase circuits by effecting a retardation of the current supplied by one of the circuits to either the coil 19 or the coil 20, so as to produce substantially a quadrature relation between the currents that produce the rotary field. It will be also understood that my invention is not limited to a three-wire connection of the coils 19 and 20 with the bus-bars or to the use of a single coil in connection with the machine to be synchronized with those which are supplying energy to the bus-bars, though the construction shown has the merit of simplicity and is therefore regarded as desirable.

Modifications as regards the size, form, and relative arrangement of parts may obviously be made without departing from the spirit and scope of the invention, and hence no limitation is intended to be placed upon the invention by reason of the details shown and described except such as may be made necessary by the state of the art.

I claim as my invention—

1. An instrument for indicating the phase relation of two alternating-current circuits comprising a rotatable, magnetizable armature, a stationary magnetizing-coil connected to one of said circuits and a plurality of stationary coils connected to the other circuit and energized by currents received therefrom to produce a rotary magnetic field.

2. An instrument for indicating the phase relation of two polyphase alternating-current circuits comprising a rotatable, magnetizable armature, a stationary magnetizing-coil connected to the conductors of one of said circuits which correspond to one phase and a plurality of stationary coils connected to the other circuit and energized by currents received therefrom to produce a rotary magnetic field and means for indicating the difference in phase relation between the two circuits.

3. An instrument for indicating the phase relation of two polyphase alternating-current circuits comprising a rotatable, magnetizable armature, a stationary magnetizing-coil connected to the conductors of one of said circuits which correspond to one phase and a plurality of stationary coils connected to the other circuit and energized by currents received therefrom to produce a rotary magnetic field, means for indicating the difference in phase relation between the two circuits and a damping device for the armature and indicating device.

4. An instrument for indicating the phase relation of two polyphase alternating-current circuits comprising a laminated ring, a magnetizing-coil concentric therewith and connected to one of said circuits, a plurality of coils connected to the other circuit and energized by currents received therefrom to produce a rotary magnetic field, a magnetizable armature in inductive relation to all of said coils and means for indicating the positions assumed by said armature.

5. An instrument for indicating the phase relation of two alternating-current circuits comprising stationary coils for producing a rotary magnetic field, one of the phases of current for producing said field corresponding to a phase of one of said circuits, a stationary coil traversed by a current corresponding in phase to the other circuit and a rotatable, magnetizable body in inductive relation to all of said coils.

6. An instrument for indicating the phase relation of two polyphase alternating-current circuits comprising a rotatable, magnetizable armature, a stationary magnetizing-coil connected to the conductors of one of said circuits which correspond to one phase and a plurality of stationary coils connected to the other circuit and having an angular relation that corresponds to the phase displacement of said circuit.

7. An instrument for indicating the phase relation of two polyphase alternating-current circuits comprising a plurality of coils having an angular displacement that corresponds to the phase displacement of one of said circuits, a coil disposed at an angle to each of the first-named coils and connected to the second circuit, a rotatable armature arranged to divert the magnetic flux due to the last-named coil into the path of the flux of one of the first-named coils and means for indicating the positions of the armature.

8. An instrument for indicating the phase and frequency relations of two alternating-current circuits comprising two coils disposed at right angles to each other for connection to one of said circuits, a coil disposed at right angles to both of the first-named coils for connection to the second circuit, a rotatable armature having two arms that project in opposite directions at the ends of the last-named coil and substantially parallel to said ends, and means for indicating the positions of said armature.

9. An instrument for indicating the phase and frequency relations of two alternating-current circuits comprising a plurality of stationary coils connected to one of said circuits and energized by currents received therefrom to produce a rotary magnetic field, a stationary coil in a plane at right angles to the planes of the other coils and connected to the second circuit, a rotatable armature having two arms that project in opposite directions at the ends of the last-named coil and means for indicating the positions of said armature.

In testimony whereof I have hereunto subscribed my name this 10th day of July, 1901.

FRANK CONRAD.

Witnesses:
 JAMES B. YOUNG,
 WESLEY G. CARR.